Nov. 17, 1959 P. B. SHARPE 2,913,033
TIRE CHAIN CONSTRUCTION
Filed Oct. 10, 1958 3 Sheets-Sheet 1

INVENTOR
Philip B. Sharpe
BY
ATTORNEY

Nov. 17, 1959  P. B. SHARPE  2,913,033
TIRE CHAIN CONSTRUCTION
Filed Oct. 10, 1958  3 Sheets-Sheet 2

INVENTOR
Philip B. Sharpe
BY
ATTORNEY

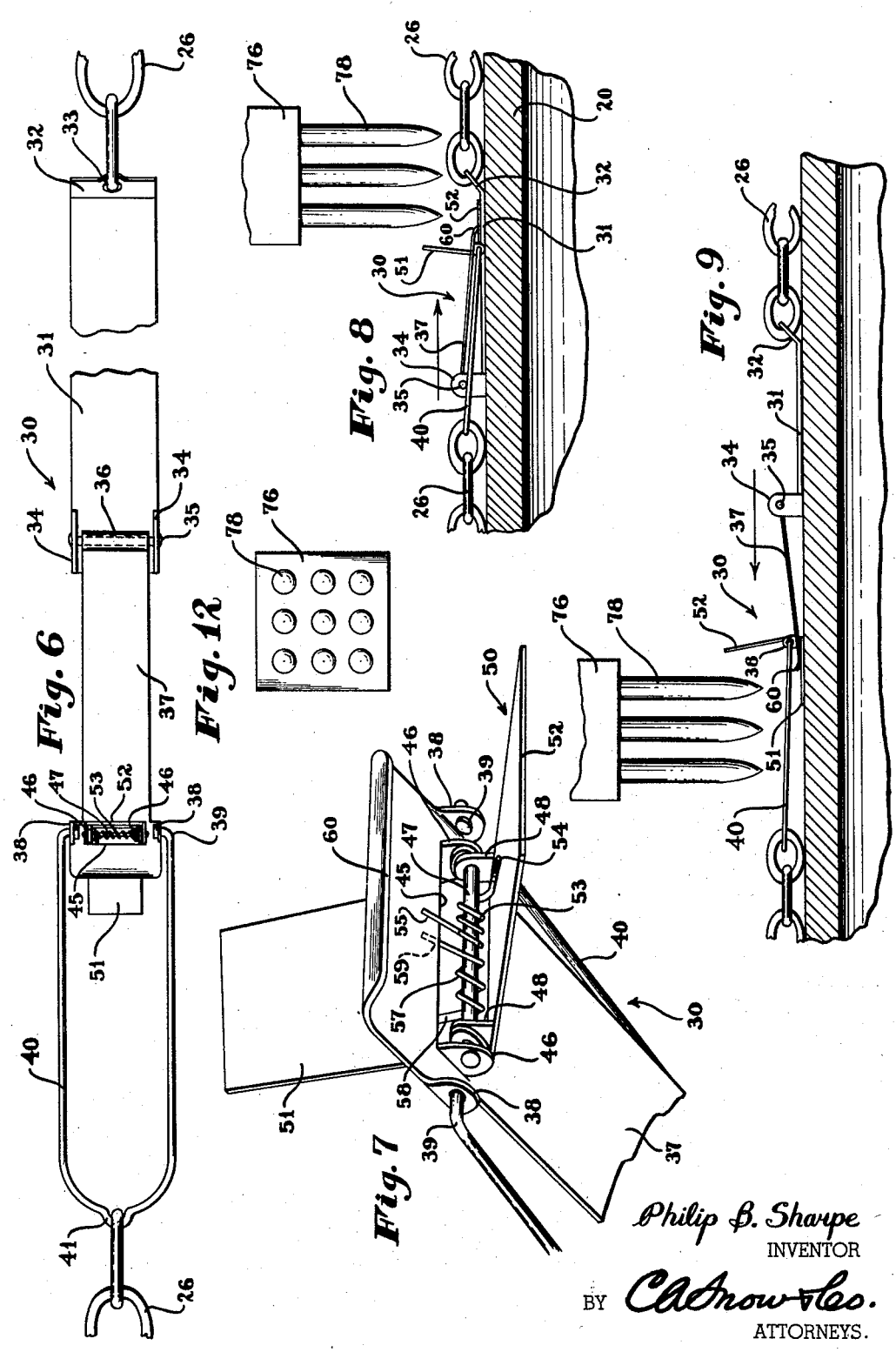

United States Patent Office 2,913,033
Patented Nov. 17, 1959

2,913,033

TIRE CHAIN CONSTRUCTION

Philip B. Sharpe, Rockport, Maine

Application October 10, 1958, Serial No. 766,430

4 Claims. (Cl. 152—214)

This invention relates to a tire chain construction, and has as its primary object the provision of an improved winter traction tire chain of the type which is adapted, when in retracted position to rest between the transverse ribs of a snow tire or the like, and which when extended has its transverse links extending outwardly beyond such ribs to overlie the same to afford additional tractive effort thereto.

An additional important object of the invention is the provision of such a tire chain having means whereby the extension and retraction of the transverse links may be controlled from a remote point, such, for example, as the dashboard of the vehicle with which the chain is associated.

A further important object of the invention is the provision of such a tire chain having extensible links in the radial or rim portions thereof, together with means whereby the links may be extended or retracted as desired, and from a remote point.

A further important object of the invention is the provision of an improved remotely operable extensible link so positioned and located.

Still another object of the invention is the provision of improved means whereby such a link may be controlled from a remote point.

Still another object of the invention is the provision of a chain of this character which may be applied to a wheel at the beginning of the winter season, and allowed to remain in position thereon until the necessity for the use thereof has ceased, and which may be repeatedly extended and retracted from a remote locality as conditions require.

A further object of the invention is the provision of such a chain provided with such a link, which, in the event of failure of the remote control means may be readily operated manually, or by means of any suitable tool.

A still further object of the invention is the provision of a device of this character which is sturdy and durable in construction, reliable and efficient in operation, and relatively simple to manufacture, assemble and utilize.

Still other objects reside in the combinations of elements, arrangements of parts, and features of construction, all as will be more fully pointed out hereinafter, and disclosed in the accompanying drawings wherein there is shown a preferred embodiment of this inventive concept.

In the drawings:

Figure 6 is a view similar to Fig. 5 but showing the link in extended position.

Figure 7 is an enlarged perspective view of one end of the link showing certain details of construction.

Figure 8 is an enlarged side sectional view of the link of Figure 5 is closed position, certain associated parts being shown therewith.

Figure 9 is a view similar to Fig. 8 but showing the link in extended position.

Figure 12 is an end elevational view of one of the elements disclosed in Figure 11.

Similar reference characters refer to similar parts throughout the several views of the drawings.

Figure 2:
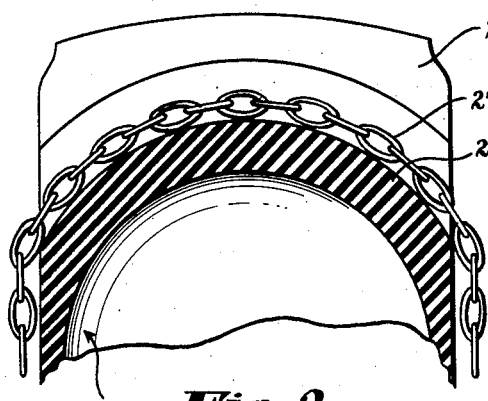
Figure 2 is an enlarged sectional view taken substantially along the line 2—2 of Figure 1 as viewed in the direction indicated by the arrows.
Figure 4:
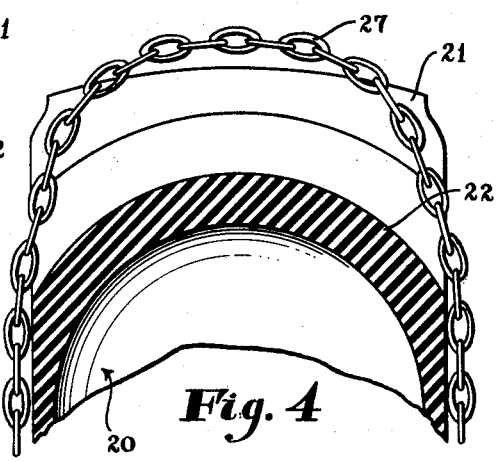
Figure 4 is an enlarged sectional view taken substantially along the line 4—4 of Figure 3 as viewed in the direction indicated by the arrows.

Having reference now to the drawings, and more particularly to Figures 1 to 4, inclusive, there is indicated at 20 a snow tire, of any desired conventional design of that type which includes transversely extending ribs 21 having depressions 22 therebetween. This type of snow tire is well known, and may encompass a wide variety of ranges of sizes in both the ribs and depressions, and it is desirable that the chain of the instant invention, generally indicated at 25 be shaped and sized to conform to a particular type or plurality of types of tires.

The chain of the instant invention comprises inner and outer rim portions 26, both of which are identical, and only one of which is disclosed in the drawings, and transverse link portions 27. The transverse link portions are adapted normally when the clamps, to be described, are in retracted position to seat in the depressions 22 between the ribs 21, so as to normally be ineffective, when in the position of Figures 1 and 2.

The rim chains 26 are preferably provided between alternate adjacent transverse link sections 27 with coil springs 28, and between alternate sections with expansible clamps generally indicated at 30, and to be more fully described hereinafter.

Figure 1:
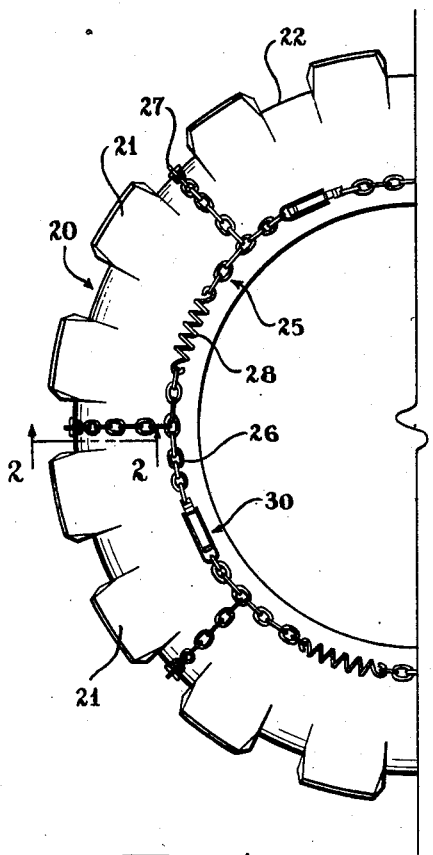
Figure 1 is a side elevational view, partially broken away, showing the chain of the instant invention as applied to a snow tire, the chain being in retracted position.
Figure 3:
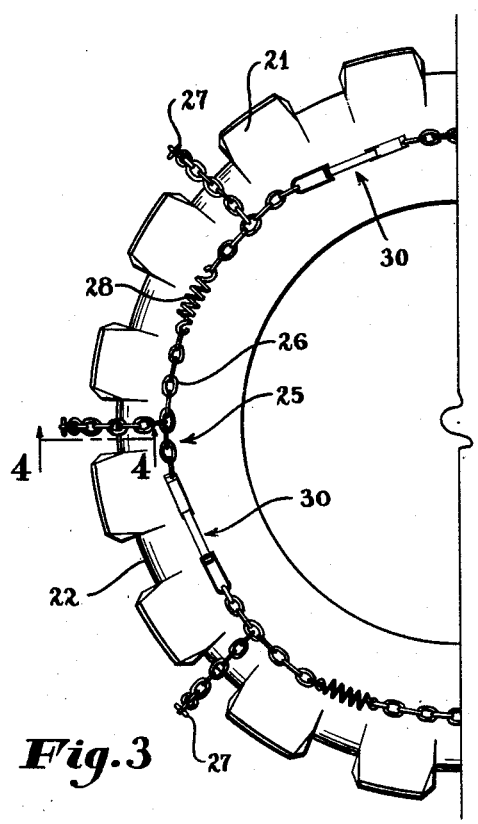
Figure 3 is a view similar to Figure 1, but showing the chain of the instant invention in extended position.

When the clamps 30 are in retracted position, the transverse links 27 assume the position shown in Figs. 1 and 2 in such manner as to be out of the way. Conversely when the clamps 30 are extended, in a manner to be more fully described hereinafter the transverse link portions 27 assume the position of Figs. 3 and 4, whereby as the wheel is rotated the extending portions 27 may overlap adjacent ribs 21, to afford additional traction thereto. The springs 28 permit the chains to assume the position disclosed in Figure 3 under centrifugal force when the wheel, for example, is spinning at high speed, whether the clamps 30 are open or closed.

Having reference now to the clamp 30 in detail, as best shown in Figures 5 to 9 inclusive, the same is comprised of a first link or base portion 31, which is provided at one end with an upturned lip 32 having an opening 33 therein through which one link of the rim chain 26 is adapted to engage. The opposite end of the base portion 31 is provided with a pair of upstanding ears 34, through which extends a pivot 35, which extends through a barrel 36 formed on one end of an intermediate link generally indicated at 37. The link 37 is provided at its opposite end with outside upstanding ears 38, which are apertured to receive the inwardly turned ends 39 of a link comprised by a wire loop 40, which comprises the outer portion of the clamp. The loop 40 is provided at one end with an offset portion 41, for engaging in an adjacent link of the rim or marginal chain 26.

The link 37 is provided between the ears 38 with an opening 45, from the opposite ends of which extend lugs or ears 46. The ears 46 are apertured to serve as journals for the end of a pin 47, which in turn passes through upstanding ears 48 on opposite sides of an L-shaped trip member, generally indicated at 50 which includes legs or plates which for purposes of convenience are designated as an opening plate 51 and a closing plate 52, the plates comprising the opposite legs of the L. A coil spring 53 surrounding the axle 47 has one of its ends 54 abutting the inner side of leaf 52, and the other of its ends 55 abutting the corresponding adjacent side of the link 37. A second coil spring 57 has one of its ends 58 abutting the inner side of opening plate 51, and the other of its ends 59 abutting the opposite side of the link 37. The springs 53 and 57 serve to urge the respective opening plates 52 and 51, respectively to open position when past center.

The end of the link 37 adjacent the opening 45 is provided with a downwardly turned lip 60, which is adapted to engage, as best shown in Figure 8, the leaf 52, when the clamp is in its closed position.

It will thus be seen that when pressure is exerted against the leaf 51, as by means of an object positioned in the path of rotation of the wheel, when the wheel is moving in the direction indicated by the arrows in Figure 8, the tilting of the leaf 51 will effect the opening of the clamp 30 to the position shown in Figure 9.

When the clamp 30 is in open or extended position as shown in Figure 9, and the wheel is rotated in the direction indicated by the arrows, the impact of a stationary member against the leaf 52 will serve by the action of the leaf 51 against the end of the link 37 to raise this link, and hence overbias the loop 40, to cause the parts to reassume the closed position of Figure 8.

Figure 10:
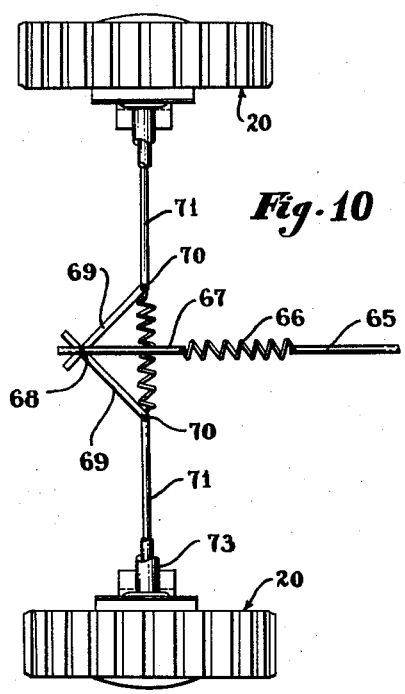
Figure 10 is a top plan view of the operating mechanism for extending and retracting the links from a remote point shown in association with certain elements of the vehicle.
Figure 5:
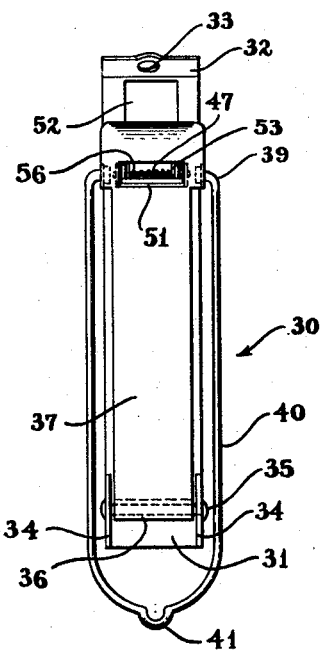
Figure 5 is a plan view of one of the extensible and retractable links associated with the tire chain.
Figure 11:
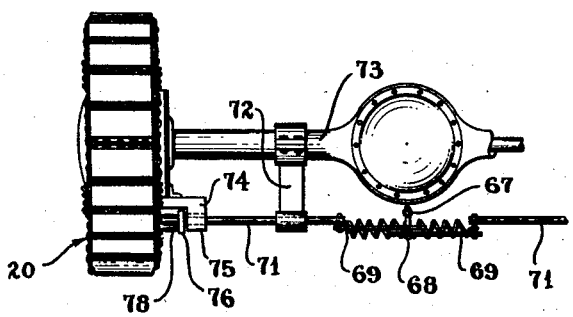
Figure 11 is a rear elevational view of the construction of Figure 10 partially broken away.

Means are provided for positioning an abutment in the path of rotation of the wheel, and as best shown in Figures 10 and 11, take the form of a rod 65, which is connected in any desired manner to a dashboard or similarly located control (not shown). The rod is connected at one end to an expansion spring 66, which is in turn connected to a short rod 67. The rod 67 is pivotally connected as by means of a pivot 68 at its other end to a pair of links 69, the opposite end of each link being connected as by means of a pin 70 to a transversely extending rod 71. The rods 71 are adapted to be supported by brackets 72, which are suitably connected to the axle 73 of the vehicle. Suitable supporting brackets 74 are provided with bores 75 adjacent each wheel 20, the ends of the rods 71 extending therethrough, while the outer end of each rod 71 is provided with a block 76 from which project a plurality of fingers 78. As best shown in Figure 12 there are nine of these fingers 78 arranged in rectangular form, to insure engagement of at least one of the fingers with either the leaf 51 or 52 when the rod 65 is actuated by means of a forward pull, or pull to the right as viewed in Figure 10 to extend the fingers into the paths of rotation of the leaves 51 or 52. The arrangement is thus such that when the fingers are extended upon forward movement of the vehicle, the clamps are adapted to be opened by means of the previously described pressure on the leaf 52, and when it is desired to retract the chain by reclosure of the clamps, opposite pressure against the leaf 52 may be effected by slow reverse movement of the vehicle.

Figure 13:
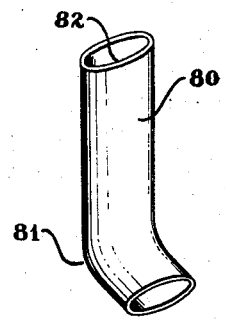
Figure 13 is a perspective view of the tool particularly adapted for actuating the clamps of the instant invention.

In the event that the mechanism controlled by the rod 65 should be inoperative, or in such cases where such a mechanism is not installed on the vehicle, any desired manual tool may be employed for the individual opening or closing of the clamps 30. Such a tool is disclosed in Figure 13, and takes the form of a flattened tubular member 80 having an end opening 82, sufficient to encircle either leaf 51 or 52, and bent as indicated at 81 to afford easier access to the inner leaf.

As previously stated both the inner and outer chains 25 are identical, and either opening of the clamps 30 on the inner chain, or alternatively manual opening of the corresponding clamps on the outer chain, will normally be sufficient to extend the transverse links 27 to an extent sufficient to accomplish the purposes of this invention.

From the foregoing it will now be seen that there is herein provided an improved tire chain construction, which accomplishes all of the objects of this invention, and others, and provides many advantages of great practical utility and commercial importance.

As many embodiments may be made of this inventive concept, and as many modifications may be made in the embodiments herein before shown and described, it is to be understood that all matter herein is to be interpreted merely as illustrative and not in a limiting sense.

What is claimed is:

1. A tire chain construction comprising rim chains adapted to rest on either side of a vehicle tire, transverse chains adapted to extend across the tire between the rim chains, expansible clamps in the rim chains between certain of the transverse chains, said clamps comprising an inner member, an intermediate link pivoted at one end to said inner member, an outer member pivoted at one end to the other end of said intermediate link, and an L-shaped trip member pivotally mounted on said other end of said intermediate member, said trip member being adapted to be contacted by an external object to close or open said clamp.

2. In combination with a wheeled vehicle having snow tires on the wheels with transverse ribs thereon, tire chains on said snow tires including rim chains and transverse chains, said rim chains having spaced expansible and retractible clamps thereon and trip means for expanding and retracting said clamps, said transverse chain seating between said ribs when said clamps are retracted and extending outwardly to overlie said ribs when said clamps are expanded, and means carried by said vehicle for movement into and out of the path of movement of said trip means for selectively expanding or retracting said clamps.

3. In combination with a wheeled vehicle having snow tires on the wheels with transverse ribs, tire chains on said snow tires including rim chains and transverse chains, said rim chains having spaced expansible and retractible clamps thereon and trip means for expanding and retracting said clamps, said transverse chain seating between said ribs when said clamps are retracted and extending outwardly to overlie said ribs when said clamps are expanded, means carried by said vehicle for movement into and out of the path of movement of said trip means for selectively expanding or retracting said clamps, and means for controlling said last mentioned means from a remote point in the vehicle.

4. A tire chain construction comprising rim chains adapted to rest on either side of a vehicle tire, transverse chains adapted to extend across the tire between the rim chains, expansible clamps in the rim chains between certain of the transverse chains, such chains comprising a first link adapted to be connected to one section of the rim chain, an intermediate link pivotally connected therein, a third link pivotally connected in the intermediate link and adapted to be connected to another section of the rim chain, and a pivotally mounted trip member having one part adapted to engage a relatively fixed object in one direction of rotation to move said links to a contracted position and to engage such relatively fixed object in the opposite direction of rotation to allow said link member to move to extended position.

References Cited in the file of this patent

UNITED STATES PATENTS

| | | |
|---|---|---|
| 954,844 | Abrams et al. | Apr. 12, 1910 |
| 1,563,960 | Brockhurst | Dec. 1, 1925 |
| 2,303,804 | Waid | Dec. 1, 1942 |
| 2,304,318 | Sava | Dec. 8, 1942 |